H. L. GOTTSCHALK.
ARTIFICIAL FISH BAIT.
APPLICATION FILED MAY 2, 1918.
1,318,072.
Patented Oct. 7, 1919.
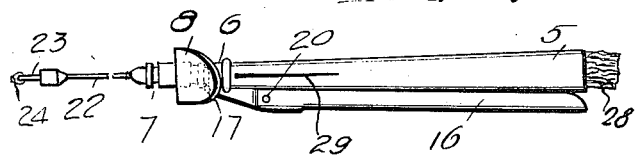
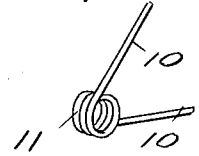
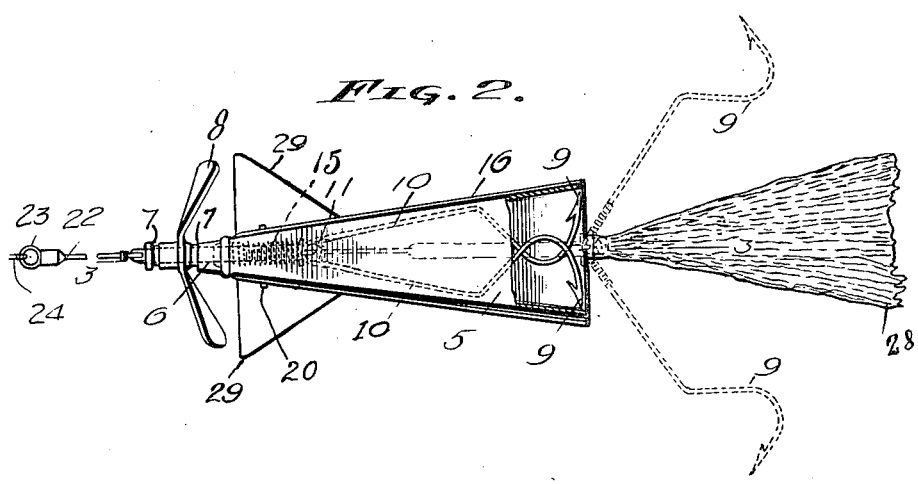
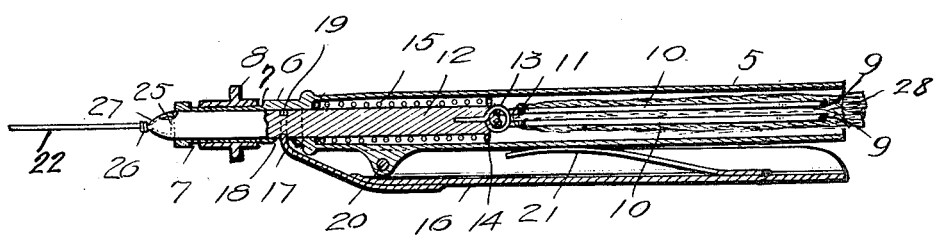
Inventor
H. L. GOTTSCHALK
By Milo B. Stevens & Co.
ATTORNEYS.

UNITED STATES PATENT OFFICE.

HENRY L. GOTTSCHALK, OF CHICAGO, ILLINOIS.

ARTIFICIAL FISH-BAIT.

1,318,072.   Specification of Letters Patent.   Patented Oct. 7, 1919.

Application filed May 2, 1918. Serial No. 232,105.

*To all whom it may concern:*

Be it known that I, HENRY L. GOTTSCHALK, a citizen of the United States, residing at Chicago, in the county of Cook and State of Illinois, have invented new and useful Improvements in Artificial Fish-Baits, of which the following is a specification.

This invention relates to artificial fish bait characterized by a body in which is concealed a pair of hooks, which when the fish seizes the bait, are projected into the mouth of the fish simultaneous with a spreading action, so that they are positively embedded in opposite sides of the mouth, and the fish is effectually prevented from getting clear of the hook and escaping.

The invention has for its object to provide a simple and efficient device of the kind stated, and to this end it consists in a novel combination and arrangement of parts to be hereinafter described and claimed, it being understood that, while the preferred embodiment of the invention has been illustrated, various changes and modifications may be made without a departure from the spirit and scope of the invention as claimed hereinafter.

In the drawing,

Figure 1 is an elevation of the bait;

Fig. 2 is a plan view partly broken away, and

Fig. 3 is a longitudinal section on the line 3—3 of Fig. 2, and

Fig. 4 is a detail in perspective showing a fragment of the double hook.

Referring specifically to the drawing 5 denotes the body of the bait, the same being hollow and formed of sheet metal or any other suitable material. The bait body is of greater length than width and it is also tapered in the direction of its forward end. At this end of the bait body is a short tubular stem 6 on which, between shoulders 7, is rotatably mounted the usual spinner 8.

In the bait body 5 are housed two hooks 9 having their shanks 10 connected by a spring coil 11, so that when the hooks are projected from the rear end of the body, they spread, the barbed ends of the hooks being presented outward in opposite directions. While housed in the bait body, the hook shanks are crossed.

In the body 5 is slidably mounted a spring backed plunger 12 to the rear end of which the hooks 9 are connected by an eye 13 on the plunger in which the coil 11 seats. The rear end of the plunger also has a shoulder 14 between which and the wall of the body at the contracted forward end thereof, is interposed a spring 15, the same being coiled around the plunger. Thus, when the plunger is drawn forward to house the hooks 9 in the bait body, the spring is compressed, and upon releasing the plunger, the spring expands and shoots the plunger rearward, projecting the hooks from the rear open end of the bait body, and as the hooks leave the bait body, they are spread by reason of their resilient connection 11.

In order to hold the plunger 12 retracted, there is pivoted on the outside of the bait body 5, to one of its wide side walls, a leaf 16 having at one end a lateral bend 17 passing through an opening 18 in the body wall aforementioned to seat in an external groove 19 in the plunger 12. The leaf 16 therefore serves as a latch to hold the plunger in retracted position.

The leaf 16 is pivoted near its forward end, as shown at 20, and between its rear end and the wall of the body 5 to which it is pivoted, is interposed a spring 21 tending to hold the rear end of the leaf outward and spaced from the body 5, with its opposite end pressed inward to hold the part 17 seated in the keeper groove 19.

When the fish seizes the bait and closes with the mouth down thereon, and on the rear end of the leaf 16, the latter is swung to take the part 17 out of the groove 19, and as the plunger 12 is now freed, the spring 15 shoots the same rearward to project the hooks 9 as hereinafter described. As the hooks have a powerful spreading tendency, they diverge as they advance, and obtain a secure hold in the sides of the victim's mouth.

When the plunger 12 is in retracted position its forward end seats in the tubular forward extremity 6 of the bait body 5. To the forward end of the plunger is connected a rod 22 having an eye 23 at its outer end for connection of the line 24.

The rod 22 is a piece of wire which is passed through a transverse aperture 25 in the forward conical end of the plunger and is twisted together at the apex of the cone, as shown at 26. In opposite sides of the cone are grooves 27 to seat the wire, said grooves extending from the ends of the aperture 25 to the apex of the cone.

The shape of the bait body 5 can be varied as desired, and it can be fashioned to resemble a small fish or a frog. The taper of the body toward its forward end tends to keep the body free of weeds. The coil 11 may also carry a brightly colored tassel 28 projecting from the rear end of the bait body to attract the fish. The plunger is retracted to reset the hooks by pulling forward on the wire rod 22.

The bait body 5 may also be provided at its forward end with two laterally extending-leveling wings shown dotted at 29 in Fig. 2.

I claim:

An artificial bait comprising a hollow body tapered in the direction of its forward end and having at said end a forwardly extending integral tubular stem provided with spaced external shoulders, a spinner mounted on the stem between the shoulders, a pair of hooks housed in the body and adapted to be projected therefrom, said hooks having a normal tendency to spread, a spring-backed plunger in the body to the rear end of which the hooks are connected, the forward portion of the plunger seating slidably in the aforesaid tubular stem, a line attaching member on the forward end of the plunger, and a latch device for holding the plunger retracted, said device having an actuating part located on the outside of the bait body, and the latter having an opening through which the latch device extends to engage the plunger.

In testimony whereof I affix my signature.

HENRY L. GOTTSCHALK.